ANCHOR FOR POST-TENSIONING PRESTRESSED CONCRETE

Original Filed July 9, 1968

INVENTOR
William F. Kelly

BY Schlesinger, Arkwright & Garvey

ATTORNEYS

United States Patent Office

Re. 27,954
Reissued Apr. 2, 1974

27,954
ANCHOR FOR POST-TENSIONING PRESTRESSED CONCRETE

William F. Kelly, New Orleans, La., assignor to Kelly Systems, Inc., New Orleans, La.

Original No. 3,524,228, dated Aug. 18, 1970, Ser. No. 743,406, July 9, 1968, which is a continuation-in-part of application Ser. No. 490,421, Sept. 27, 1965, now Patent No. 3,399,434. Application for reissue Nov. 19, 1971, Ser. No. 200,565

Int. Cl. F16g *11/02, 11/04*

U.S. Cl. 24—126 14 Claims

Matter enclosed in heavy brackets [ ] appears in the original patent but forms no part of this reissue specification; matter printed in italics indicates the additions made by reissue.

ABSTRACT OF THE DISCLOSURE

An anchor for post-tensioning prestressed concrete including a case having a central bore through which a tendon passes, the internal wall of the case defining the central bore being tapered in a manner to form a compound angle with respect to the longitudinal axis of the case, a chuck comprising chuck segments positioned within, and movable longitudinally with respect to the case, the inner faces of the chuck segments being provided with a series of teeth engageable with the outer surface of the tendon which passes through the case and chuck, the chuck segments being made of a ductile material to effect conformation thereof to the inner wall of the case and tendon, and to distribute the forces exerted by the chuck segments on the tendon over the length thereof.

This invention is an anchor for post-tensioning prestressed concrete, and is a continuation-in-part of application Ser. No. 490,421, filed Sept. 27, 1965, now Pat. No. 3,399,434.

BACKGROUND AND OBJECTS

In the use of anchors for gripping and holding tendons or the like, difficulty is sometimes experienced due to the exertion of excessive point pressure by the tendon-engaging teeth of the chuck segments on the tendon strands, causing shearing of the tendon, with resultant failure of the anchor and/or tendon strands.

It is an object of this invention to provide a tendon-gripping anchor or the like, for post-tensioning prestressed concrete, the anchor including means for securely holding a tendon without exerting severing pressure on the strand at a point or points, but distributing the gripping forces gradually over the length or area of the tendon in contact with the holding chuck.

Another object is to provide a tendon-gripping anchor including a case having a non-uniformly tapered bore, in which is positioned a chuck comprising segments having teeth for grippingly engaging the tendon, the tendon being pressure molded to the chuck and the segments of the chuck being deformed to conform to the wall of the case and tendon.

A further object is to provide a tendon-gripping anchor of the character described, wherein the anchor case is provided with an axial bore through which the tendon passes, the inner wall of the case defining the axial bore being tapered at compound angles to the longitudinal axis of the bore through a substantial portion of the case's length, with the angle of the taper being decreased at the small end of the bore to allow relief of the chuck on a graduated basis.

Other objects are to provide an anchor of the character described, wherein the angles of the case's and chuck's taper are small, to effect a locking together of the chuck, tendon and case to produce substantially a cold pressure weld between the three major parts, and prevent any accidental or unwanted release of the anchorage; to provide a cold-forming of the chuck against the case and tendon by the tremendous transverse pressure developed by the very low angle of the case and chuck taper, to provide an anchor wherein the deeper the chuck is pulled into the case, the greater is the distance of relief for the chuck, and to provide an anchor which aligns a tendon placed therein along the true axis of the case.

Additional objects will be obvious from a consideration of the following description of the presently preferred form of the present invention, taken in conjunction with the appended drawings.

DESCRIPTION OF FIGURES OF DRAWING

DESCRIPTION OF FIGS. 1 TO 5

Figure 1:
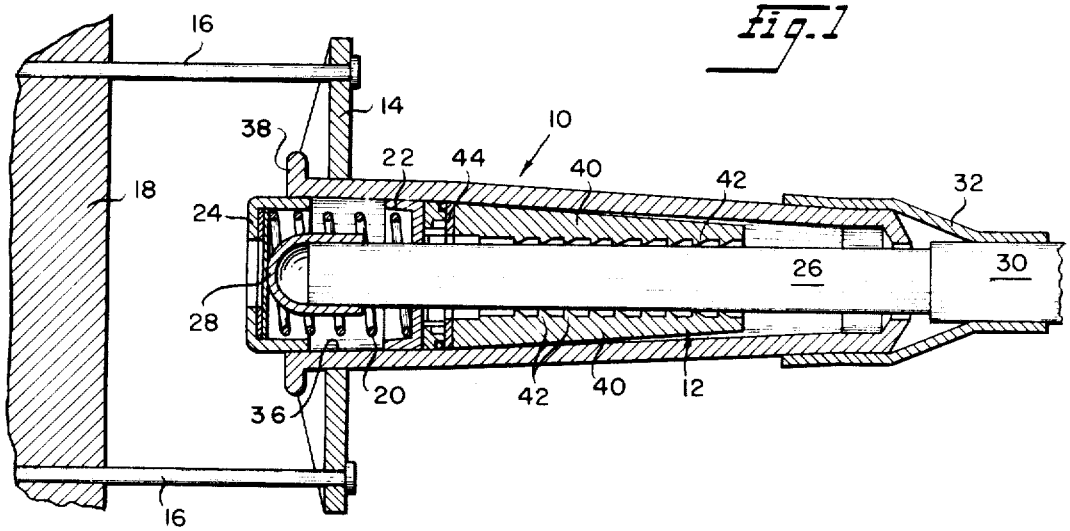
FIG. 1 is a longitudinal sectional view of the anchor of the present invention, illustrating its use.

In FIG. 1, there is illustrated an anchor constructed in accordance with the present invention including a case 10 in which is positioned a chuck 12. The case and chuck are shown in an arrangement such as set out in copending application Ser. No. 490,421, including a reaction plate 14 which is fixed to the outer periphery of case 10, which reaction plate is secured by nails 16 to a form 18. Additionally, chuck 12 is held within case 10 by means of a helical spring 20, one terminal of which lies within a cup 22 and the opposite end thereof abuts a closure cap 24, which is in frictional engagement with the inner walls of case 10 at the large end thereof. A tendon 26 extends through the anchor and a thimble-like finder 28 is placed over the extremity of the tendon to facilitate insertion into the anchor and to prevent the chuck from engaging the tendon until the tendon is completely inserted in the anchor. That portion of tendon 26 which extends beyond the anchor is covered by a jacket 30, a sleeve 32 being placed over the terminal of the jacket and the adjacent terminal of the case 10 to prevent entry of concrete into the anchor.

Referring now to FIGS. 2 to 5, it will be seen that case 10 comprises an elongated cylindrical body 34 which is non-uniformally tapered from one end to the other, and having an axial bore 36 extending through body 34, the cross-sectional area of which bore is decreased from one end of the body to the other. The large end of the body is provided with a flange 38.

Figure 2:
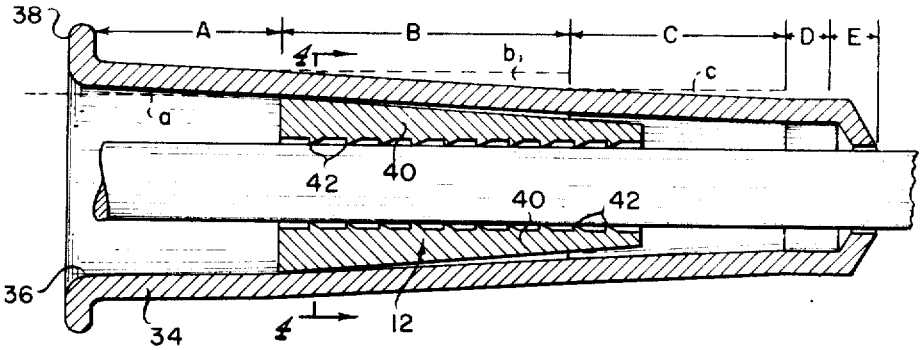
FIG. 2 is a longitudinal sectional view of the case and chuck forming a part of the present invention, illustrating the chuck in inoperative position.
Figure 3:
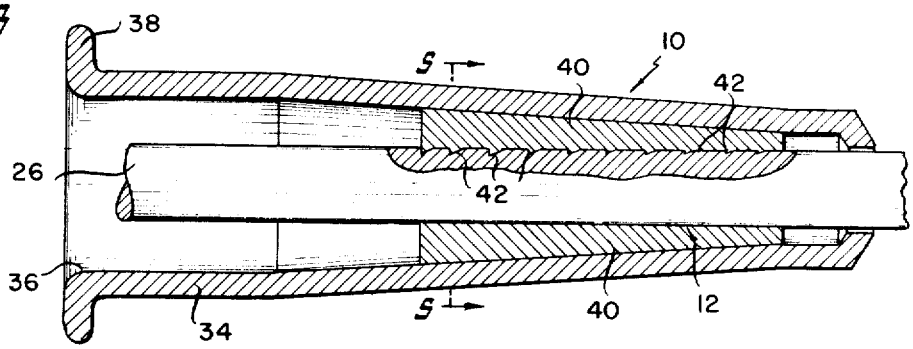
FIG. 3 is a view similar to FIG. 2, illustrating the chuck in operative position.

As indicated in FIGS. 2 and 3, that portion of body 34 adjacent flange 38 extends for a distance A forming an angle a with a line parallel to the longitudinal axis of case 10. The angularity of body 34 is then increased through a distance designated B and forms an angle b with respect to a line drawn parallel to the longitudinal axis of case 10.

The angularity of the taper of body 34 is changed again for a distance C, and forms an angle c with respect to a line drawn parallel to the longitudinal axis of the case.

The angularity of body 34 is once again altered for a distance D and terminates in an inwardly directed flange portion extending longitudinally for a distance E, the flange portion being angularly disposed at approximately a 60° angle to the body. In the drawing, there is illustrated an anchor adapted for a tendon of ½-inch diameter and the size and taper of the case and chuck are designed to obtain optimum results with that size tendon. Properly sized cases and chucks, with slight variations, may be employed with different sized tendons.

For use with jaw segments having a 4° angularity, optimum results are obtained when casing body is constructed having the following relationships:

EXAMPLE 1—[⅜] 1/2 INCH TENDON

| | |
|---|---|
| A=1" | a=1° |
| B=2⅜"–2 7/16" | b=[4½°] *3°30"* |
| C=1 1/16"–⅝" | c=[4°15'] *3°15"* |
| D=⅛" | d=0° |
| E=3/16" | e=60° |

EXAMPLE 2—[½] 5/8 INCH TENDON

| | |
|---|---|
| A=1" | a=1° |
| B=2" | b=[4°] *3°45"* |
| C=1½" | c=3°30" |
| D=⅛" | d=0° |
| E=3/16" | e=60° |

Case 10 is preferably of a die formed steel in which the contours above described can be accurately imparted thereto. Case 10 may be of various sizes to accommodate tendons of different diameters.

Figure 4:
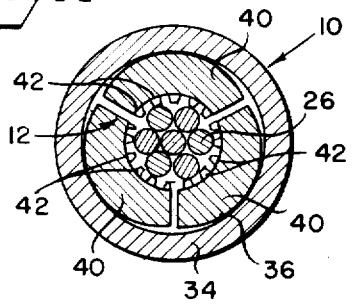
FIG. 4 is a sectional view taken along the line 4—4 of FIG. 2, looking in the direction of the arrows.

Chuck 12 includes a plurality of like, elongated, tapering chuck segments 40 which are transversely arcuate in cross section to nearly complement the contour of the inner wall of case 10 (see FIG. 4). Longitudinally, the tapered face is straight. However, upon exertion of pressure thereon by a tendon, the segments bend transversely and longitudinally to conform to the contour of the case.

The inner face of each segment 40 is provided with a series of individual, tendon-engaging teeth 42 extending through a substantial portion of the length of each segment. Segments 40 are held together at the large end by a suspension ring assembly 44 which also spaces the segments from each other evenly around the tendon, to effect uniform gripping engagement therewith.

The jaw segments are preferably of a cold forged ductile, surface-hardened steel, with the teeth having a brinnel hardness of approximately 58 and approximately 0.015 inch deep for the anchor size shown.

Figure 5:
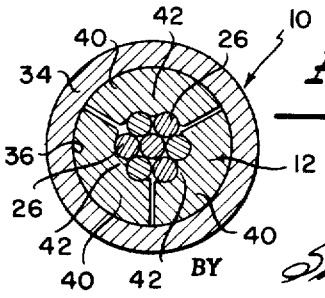
FIG. 5 is a sectional view taken along the line 5—5 of FIG. 3, looking in the direction of the arrows.

It will be noted from a comparison of FIGS. 4 and 5 that the radius of curvature of chuck segments 40 is less than that of the inner wall of case 10 defining the axial bore thereof. Upon exertion of tension on the chuck, segments 42 are deformed into contiguous engagement with the inner wall of the case.

OPERATION

In the use of the present invention, tendon 26 is inserted into the anchor in the manner illustrated in FIG. 1. At this time, chuck 12 lies adjacent that portion of case 10 extending through distance B and a portion of distance C. At this time, it will be noted that the smaller end of the chuck is spaced from the wall of case 10 and that teeth 42 are in engagement with, but not gripping tendon 26.

Upon exertion of tension on tendon 26, chuck 12 moves longitudinally through case 10 in the direction of the case taper to wedge the outer walls of the segments against the inner wall of the case, and forcing teeth 42 into gripping engagement with the tendon.

By virtue of the angularity of chuck segment 40 and the taper of that portion of the case through angle b, a wedging effect takes place. As the chuck segment continues to be drawn through the case, the angularity of the case is decreased as indicated by angle c. This allows relief of the leading portion of the chuck segments and, due to the ductile nature of the chuck segments, the latter are deformed in a direction away from the tendon, since relief is afforded by the decreased angularity indicated at angle c extending through distance C of the case.

Accordingly, instead of the forward teeth of the chuck segment exerting severing pressure on the tendon, this relief acts to distribute the force exerted by the teeth proportionately over the full holding portion of each of the chuck segment's length. It in effect makes a practical uniform force triangle for holding the tendon. In addition, the low angles of the case's and chuck segment's taper bring about the pressure molding of the tendon into the chuck, and the deformation of the chuck during the molding process to conform to the walls of the case and tendon, as shown to advantage in FIG. 5. This further effects a locking together of the chuck, the tendon and the case to the point of creating substantially a cold pressure weld between the three major parts which prevents any unwanted release of the anchorage. As a result of this welding effect, it has been found that a reverse pull of up to 80% of the force required to lock the parts together is necessary to release them again, with the tendon cut free. This cold forming of the chuck against the case and tendon is made possible by the tremendous transverse pressure developed by the very low angle of the chuck and the case, not exceeding 5°, plus the compounded reduction of the case taper.

While there has been herein shown and described the presently preferred form of the present invention, it is to be understood that such has been done for purposes of illustration only, and that various changes may be made therein within the scope of the claims hereto appended.

What I claim is:

1. An anchor for post-tensioning prestressed concrete comprising (a) an elongated case having an axial bore, (b) the inner wall of said case defining the axial bore being tapered from one end to the other, the angularity of the taper being altered at a point intermediate the length of the case to form a bore section at the larger end of the case and a first tapered bore section in an intermediate portion of said case, and (c) a chuck of ductile material positioned within the axial bore of said case, said chuck including, (d) a plurality of chuck segments, (e) each of said chuck segments being transversely arcuate, (f) each chuck segment being tapered longitudinally for engagement with the tapering inner wall of said case, (g) the inner face of each chuck segment being provided with rows of tendon-engaging teeth, (h) said chuck further including means for holding said chuck segments together, (i) the angularity of the taper of the inner wall of said case being altered a second time thereby forming a second tapered bore section adjacent the narrow end of said case, (j) the angularity of said second tapered bore section produced by the second alteration is less than the taper of said first tapered bore section to offer relief to the forward portions of said chuck segments under tension.

2. The anchor of claim 1, with the addition of (a) an inwardly directed flange extending angularly from the smaller end of the case for aligning a tendon inserted therein.

3. The anchor of claim 1 wherein (a) the inner wall taper of the case with respect to a line drawn parallel to the longitudinal axis of the case does not exceed 5°.

4. The anchor of claim 1 wherein the chuck is located between the first and second tapered bore sections when the chuck is under tension.

*5. An anchor for use with a tendon in post-tensioning pre-stressed concrete comprising:*

*(a) an elongated case having an axial bore through which the tendon passes,*

*(b) the inner wall of said case defining the axial bore being tapered inwardly between the ends thereof,*

*(c) the angularity of the inner wall taper being altered at the narrow end thereof intermediate the length of said case to provide uniformly tapered first and second working bore sections,*

*(d) the angularity of the taper of said second working bore section being slightly less than the angularity of the taper of said first tapered working bore section, and*

*(e) a chuck longitudinally movable within the axial bore of said case,*

*(f) said chuck including a plurality of chuck segments of deformable material,*

*(g) the outer walls of said chuck segments being transversely arcuate and uniformly longitudinally tapered throughout their length in the direction of the case taper,*

*(h) the inner walls of said chuck segments having teeth extending longitudinally thereof for engagement with the tendon extending through the bore of the case,*

*(i) said chuck being drawn through said first working bore section and partially through said second tapered working bore section upon pulling the tendon through the case,*

*(j) whereby wedging of said chuck with the wall of said first working bore section is effected and the reduced taper of said second tapered working bore section affords relief to the leading portion of said chuck and permits deformation of the chuck segments to conform to the inner wall of said case, thereby distributing the force excited by the chuck teeth over the length of the chuck segments.*

*6. The anchor of claim 5, wherein:*

*(a) the longitudinal taper of the jaw elements is slightly greater than the taper of the case.*

*7. The anchor of claim 5, wherein:*

*(a) the difference in the angularity of said first and second tapered working bore sections does not exceed 2°.*

*8. The anchor of claim 5, with the addition of:*

*(a) an inwardly directed flange extending angularly from the smaller end of the case for aligning and serving as a bearing for the tendon inserted therein.*

*9. The anchor of claim 5, wherein:*

*(a) the inner wall taper of said first tapered working bore section is less than the taper of said chuck with respect to lines drawn parallel to longitudinal axis of the case and chuck.*

*10. The anchor of claim 5, with addition of:*

*(a) a reaction plate secured to the outer periphery of said case.*

*11. The anchor of claim 5, with the addition of:*

*(a) a closure cap engaged with the large end of said elongated casing, and*

*(b) spring means within said elongated casing between said closure cap and chuck, to provide a dead end anchor.*

*12. An anchor for post-tensioning pre-stressed concrete comprising:*

*(a) an elongated case having an axial bore through which a tendon passes,*

*(b) the inner wall of said case defining the axial bore being tapered between the ends thereof,*

*(c) the angularity of the inner wall taper being altered at a point intermediate the length of said case, thereby providing first and second tapered working bore sections,*

*(d) the inner wall taper of said first tapered working bore section being not in excess of 5° with respect to a line drawn parallel to the longitudinal axis of said case,*

*(e) the inner wall taper of said second tapered working bore section with respect to a line drawn parallel to the longitudinal axis thereof being less by no more than 2°, than the inner wall taper of said first tapered working bore section,*

*(f) a chuck of ductile material movably positioned within the axial bore of said case,*

*(g) said chuck including a plurality of chuck segments,*

*(h) means for holding said chuck segments together,*

*(i) the outer walls of said chuck segments being transversely arcuate and tapered longitudinally for wedging engagement with the tapered inner wall of said case,*

*(j) the taper of said chuck segments being slightly greater than the taper of said first and second tapered working bore section,*

*(k) the inner walls of said chuck segments having rows of teeth for engagement with the tendon extending through the bore of the case,*

*(l) said chuck being drawn through said first tapered working bore section and partially through said second tapered working bore section upon pulling the tendon through the case,*

*(m) whereby the reduced taper of said second tapered working bore section affords relief to the leading portion of said chuck and permits deformation of the chuck to conform to the inner wall of said case, thereby distributing the forces exerted by the chuck teeth over the length of the chuck segments.*

*13. The anchor of claim 12, with the addition of:*

*(a) a reaction plate secured to the outer periphery of said case.*

*14. The anchor of claim 12 with the addition of:*

*(a) a closure cap engaged with the large end of said elongated casing, and*

*(b) spring means within said elongated casing between said closure cap and chuck, to provide a dead end anchor.*

References Cited

The following references, cited by the Examiner, are of record in the patented file of this patent or the original patent.

UNITED STATES PATENTS

| | | | |
|---|---|---|---|
| 1,601,255 | 9/1926 | Marra | 24—126 |
| 2,209,933 | 7/1940 | Rogoff | 24—126 |
| 2,222,493 | 11/1940 | Barlow | 24—126 |
| 2,834,081 | 5/1958 | Stump | 24—126 |
| 3,422,506 | 1/1969 | Turner | 24—263 CA |
| 1,797,494 | 3/1931 | Campbell | 24—263 CA |
| 3,049,775 | 8/1962 | Ondeck | 24—126 R |
| 1,548,543 | 8/1925 | Moody | 24—263 DS |
| 1,662,984 | 3/1928 | Scott | 24—263 SC |
| 1,968,297 | 7/1934 | Hild | 24—263 DN |
| 2,180,866 | 11/1939 | Cryer | 24—126 R |
| 3,098,275 | 7/1963 | Schweitzer | 24—126 R |

FOREIGN PATENTS

| | | | |
|---|---|---|---|
| 195,083 | 1/1958 | Austria | 52—223 L |

BERNARD A. GELAK, Primary Examiner

U.S. Cl. X.R.

52—223 L